United States Patent [19]

Sanada

[11] Patent Number: 4,587,606
[45] Date of Patent: May 6, 1986

[54] HIGH VOLTAGE TRANSFORMER AND RECTIFIER ARRANGEMENT

[75] Inventor: Masashi Sanada, Tochigi, Japan
[73] Assignee: Kabushiki Kaisha Toshiba, Japan
[21] Appl. No.: 659,432
[22] Filed: Oct. 10, 1984
[30] Foreign Application Priority Data

Oct. 12, 1983 [JP] Japan ................................. 58-191444

[51] Int. Cl.$^4$ ............................................. H02M 7/10
[52] U.S. Cl. ..................................... 363/68; 363/126; 378/104
[58] Field of Search ....................... 363/67, 68, 69, 70, 363/126; 378/104, 101; 336/185

[56] References Cited

U.S. PATENT DOCUMENTS

| | | | |
|---|---|---|---|
| 3,422,340 | 1/1969 | Richmond et al. | 363/68 |
| 3,701,002 | 10/1972 | Toba | 321/15 |
| 4,545,005 | 10/1985 | Mudde | 363/68 |

FOREIGN PATENT DOCUMENTS

| | | | |
|---|---|---|---|
| 0116996 | 8/1984 | European Pat. Off. | |
| 1059102 | 6/1959 | Fed. Rep. of Germany. | |
| 2045012 | 10/1980 | United Kingdom | 363/68 |

OTHER PUBLICATIONS

Japanese Patent Disclosure (KOKAI) No. 57-177273.

*Primary Examiner*—William H. Beha, Jr.
*Attorney, Agent, or Firm*—Finnegan, Henderson, Farabow, Garrett & Dunner

[57] ABSTRACT

A secondary winding, divided into a plurality of sections, is provided around a primary winding of the air-core type. First and second diode groups are disposed on four substrates which surround the secondary winding. Diodes in each of the first and second diode groups are disposed on two adjacent substrates so that these diodes are connected in series so as to have the same polarity direction, respectively. The first and second diode groups are respectively divided into a plurality of diode sections. Winding start ends and winding finish ends of winding sections are coupled between the respective two adjacent diode sections. The diode sections disposed on the each substrate are arranged to be spaced apart along the axial direction of the primary winding. One of the diode sections to which induced voltages of the winding sections are applied is disposed on two adjacent substrates, and the other diode section is disposed on the other two adjacent substrates. Positions of these diode sections are shifted along the axial direction of the primary winding. Therefore, the diode sections to which the induced voltages of the winding sections are applied are disposed on different substrates and are not on the same plane.

7 Claims, 4 Drawing Figures

HIGH VOLTAGE TRANSFORMER AND RECTIFIER ARRANGEMENT

BACKGROUND OF THE INVENTION

The present invention relates to a high voltage transformer and, more particularly, to a compact and light-weight high voltage transformer having a divided secondary coil and rectifiers.

In a conventional high voltage transformer (Japanese Patent Disclosure No. 57-177273), in order to rectify a high voltage at secondary windings, a bridge consisting of rectifiers of a high breakdown voltage type is provided. A bridge of this type is dipped in an insulation oil in a tank with first and second windings. For this reason, since a wide breakdown voltage space must be maintained, the size of the device is undesirably increased.

A high voltage transformer is known wherein a plurality of taps are led from a secondary winding and diodes are arranged between the respective taps in accordance with their potentials so as to perform full-wave rectification. However, in this high voltage transformer, too high a breakdown voltage is spatially required for the respective diodes. In addition, since secondary windings are alternatively coupled, wiring becomes complex.

SUMMARY OF THE INVENTION

It is an object of the present invention to provide a compact and light-weight high voltage transformer having a minimized dielectric space.

A high voltage transformer according to the present invention comprises:

a primary winding;

a secondary winding, disposed to surround said primary winding, having a plurality of winding sections; and a rectifier circuit having four planes which surround said secondary winding, the longitudinal direction of each being parallel with the axial direction of said secondary winding; first and second diode groups each of which has a plurality of diode sections including one or more diodes, the diodes in each of said first and second groups being connected in series so as to have the same polarity directions and being disposed in said planes; and connecting means for connecting said diode sections to said winding sections so that both diode sections to which voltage induced in each of said winding sections is applied are not disposed on the same plane.

According to the present invention, both diode sections to which voltage induced in the each winding section is applied are disposed on different planes, respectively. Therefore, diodes can be densely disposed on respective planes. In a predetermined space, diodes, which are important for maintaining a high breakdown voltage, can be spaced as far apart as possible. For this reason, the transformer can be compact. In addition, since a breakdown voltage between respective potentials can be minimized, generation of a corona can be prevented.

DETAILED DESCRIPTION OF THE PREFERRED EMBODIMENTS

Figure 1:
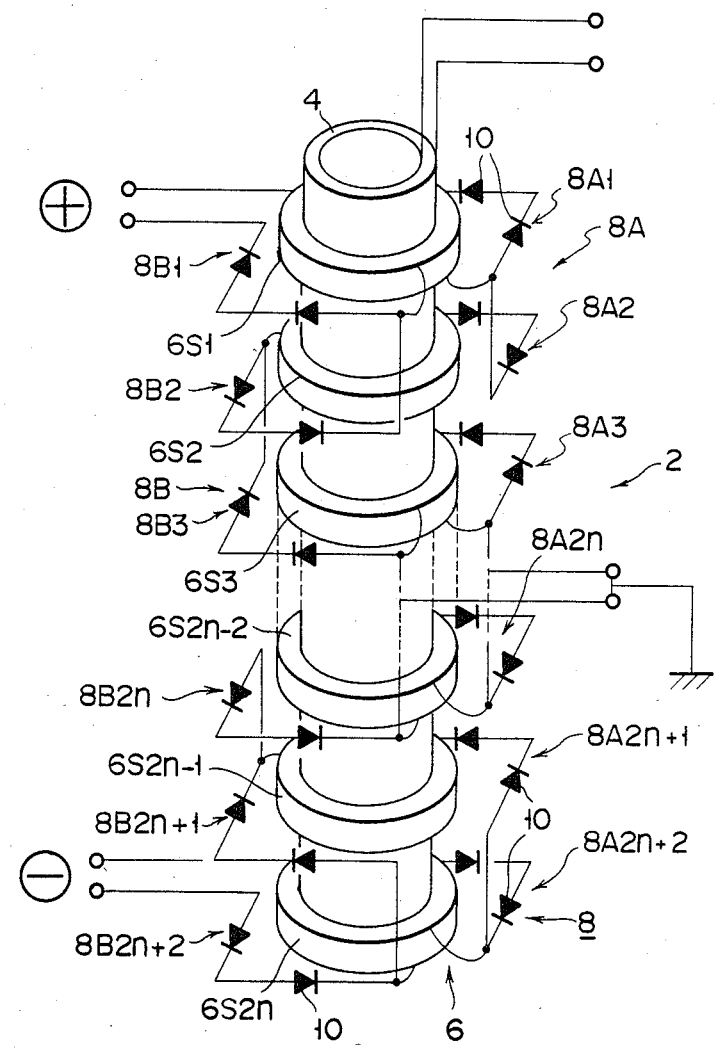
FIG. 1 is a perspective view of a high voltage transformer according to an embodiment of the present invention.
Figure 2:
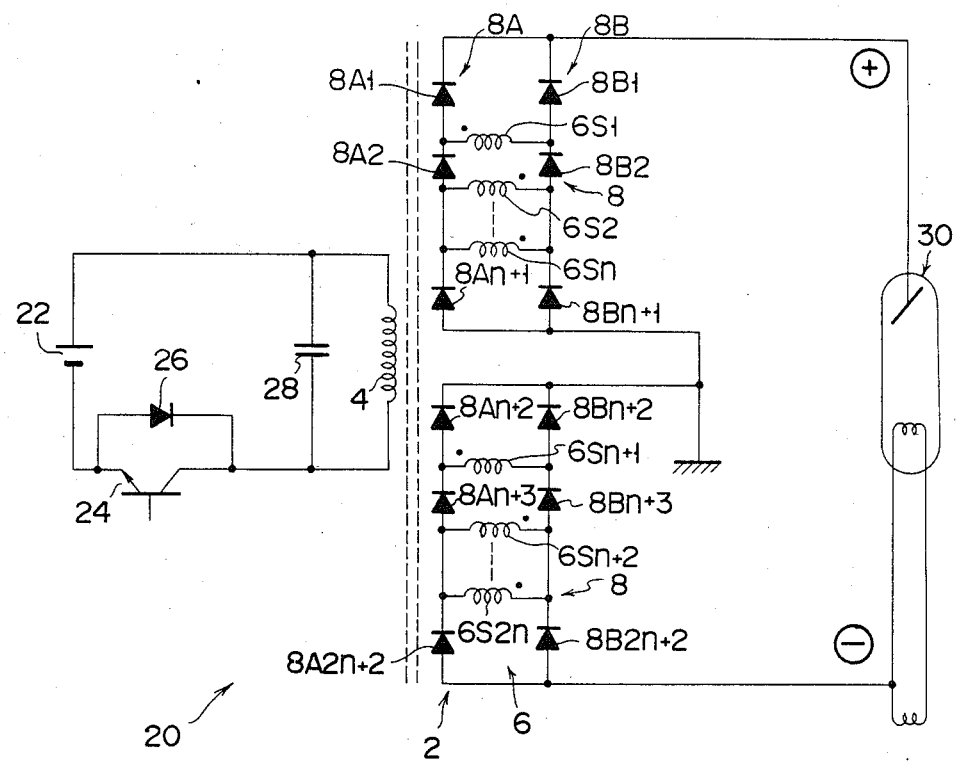
FIG. 2 is a circuit diagram of a high voltage generator using the high voltage transformer.

FIG. 1 shows a high voltage transformer 2 according to an embodiment of the present invention. FIG. 2 shows a high voltage generator 20 using this high voltage transformer 2. A DC source 22 and primary winding 4 of the air-core type are connected together by means of a switching element 24, to which a diode 26 is connected in inverse parallel. A capacitor 28 is connected in parallel to the primary winding 4. The switching element 24, diode 26, capacitor 28, and primary winding 4 jointly constitute a voltage-resonance-type single-end switching circuit. A secondary winding 6 of the transformer 2 consists of a 2n number of winding sections (6S1, 6S2, ..., 6Sn, 6Sn+1, 6Sn+2, ..., 6S2n−2, 6S2n−1, 6S2n). Thus a DC voltage supplied to the primary winding 4 is conducted to the secondary winding in the stepped-up form. A plurality of diode sections, 8A1, 8A2, 8A3, ..., 8An, 8An+1, 8An+2, ..., 8A2n, 8A2n+1, 8A2n+2, 8B1, 8B2, 8B3, ..., 8Bn, 8Bn+1, 8Bn+2, ..., 8B2n, 8B2n+1, 8B2n+2 is connected to the secondary winding 6 to jointly constitute a rectifier circuit 8. Each diode section has a plurality of diodes 10. The X-ray tube 30 is connected as a load to the output terminal of the rectifier circuit 8.

The winding sections 6S1, 6S2, ..., 6S2n of the secondary winding 6 are wound in a direction starting from the winding start ends, for example, as indicated by the dots shown in FIG. 2. These winding sections and diode sections are connected in a ladder form. The rectifier circuit 8 has two diode groups 8A and 8B, and diodes in the respective diode groups 8A and 8B are coupled in series so as to have the same conductive directions (polarity directions). As shown in FIG. 2, the diode groups 8A and 8B are coupled in parallel so as to have the same polarity directions. Cathode sides of the diode groups 8A and 8B are coupled to a positive terminal of the X-ray tube 30, and anode sides thereof are coupled to a negative terminal of the X-ray tube 30. The winding sections 6S1 to 6S2n of the secondary winding 6 are coupled to series connecting points of the respective diode sections to be bridged between the diode groups 8A and 8B coupled in parallel with each other. For example, the wiring section 6S1 is coupled between a connecting position of the diode sections 8A1 and 8A2 and that of the diode sections 8B1 and 8B2. Winding directions of the respective winding sections of the secondary winding 6 are alternatively reversed (FIG. 2). In order to maintain a predetermined breakdown voltage, the diode sections 8A1, 8A2, ..., 8An+1, 8An+2, ..., 8A2n+2, 8B1, 8B2, ..., 8Bn+1, 8Bn+2, ..., 8B2n+2 respectively consist of a plurality of diodes 10 (e.g., eighteen diodes) (in FIG. 1, only two diodes are shown and in FIG. 2, only six diodes are shown). However, needless to say, the respective diode sections can consist of only one diode.

An arrangement of the primary winding 4, the secondary winding 6 and the diode groups 8A and 8B of the transformer 2 will be described in more detail with reference to FIG. 1. The primary winding 4 is of an air-core type. The secondary winding 6 is coaxially arranged around the primary winding 4. The secondary winding 6 is divided into 2n sections 6S1 to 6S2n. Leads are taken from respective winding start ends and winding finish ends.

Figure 3:
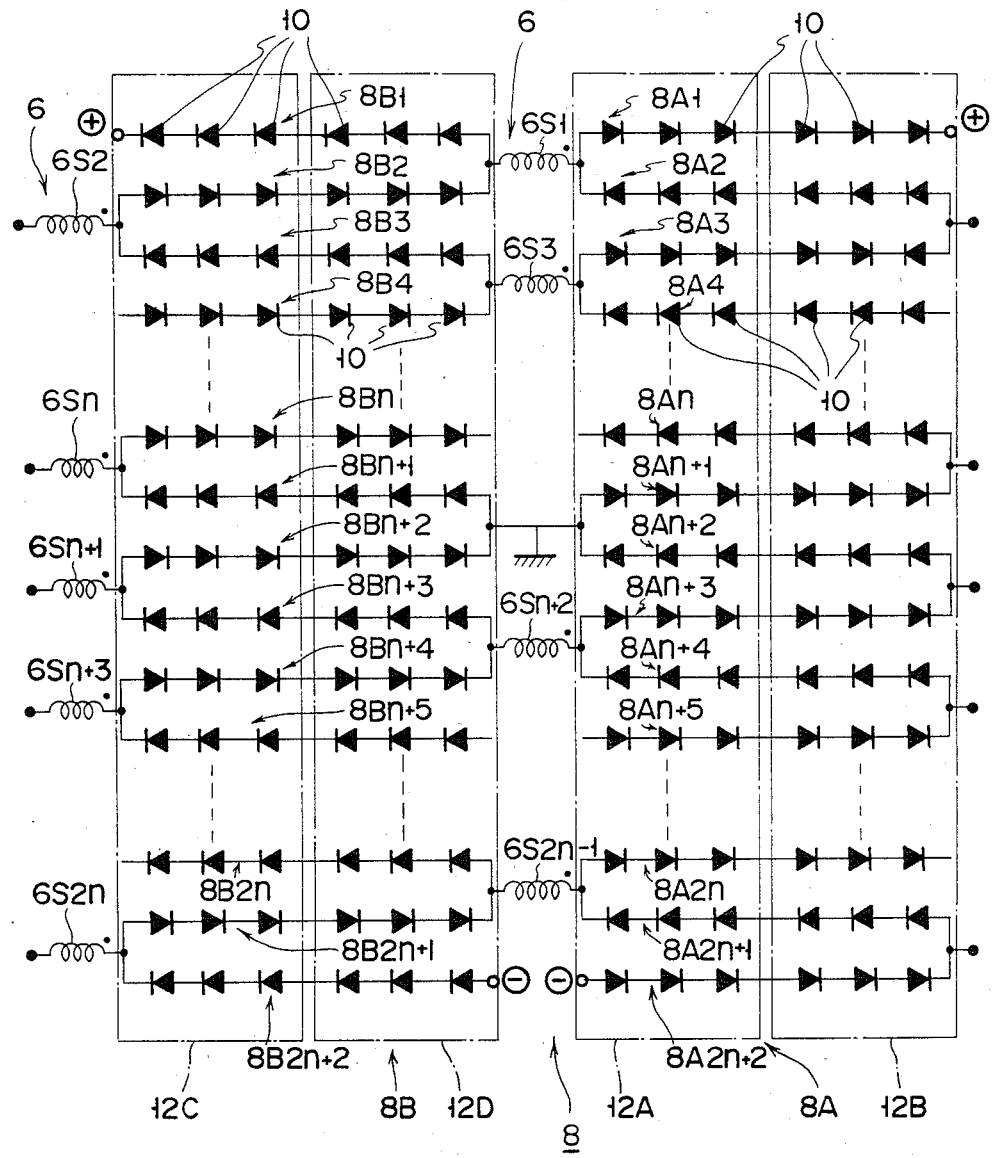
FIG. 3 is an exploded view of the high voltage transformer.

As shown in FIG. 1, the diodes 10 are disposed in four planes which surround the primary and secondary windings 4 and 6 so as to be parallel with an axial direction of the windings 4 and 5. The diode group 8A is disposed on two adjacent planes, and the diode group 8B is disposed on the other two adjacent planes. In order to dispose diodes at such positions in practice, as shown in the exploded view of FIG. 3, the diode group 8A is disposed on two substrates 12A and 12B, and the diode group 8B is disposed on two other substrates 12C and 12D. These substrates 12A, 12B, 12C and 12D are arranged to surround the primary and secondary windings 4 and 6. The diode sections 8A1 to 8A2n+2 and 8B1 to 8B2n+2 are disposed to be spaced apart from each other along the axial direction of the primary winding 4. The diodes of the respective diode sections are arranged along a line perpendicular to the axial direction of the primary winding 4. The two respective adjacent diode sections along the axial direction of the primary winding 4 are arranged on the respective substrates so as to have their polarities reversed. Connecting points which couple the respective diode sections are coupled to the winding sections. Particularly, a line which couples the diode sections 8An+1 and 8An+2 and a line which couples the diode sections 8Bn+1 and 8Bn+2 are grounded. As shown in FIG. 2, the diode sections and winding sections are connected in a ladder form.

The operation of the high voltage generator having such a configuration will now be described. When the switching element is turned on, positive voltages are induced in the respective winding sections 6S1, 6S2, 6S3, . . . at the winding start ends indicated by dots. In this case, a voltage from the DC source 22 is directly applied to the primary winding 4. Voltages induced in the secondary winding 6 are sequentially added through the diode sections 8A2n+2, 8B2n+1, 8A2n, . . . , 8An+5, 8Bn+4, 8An+3, 8Bn+2, 8An+1, 8Bn, . . . , 8B4, 8A3, 8B2, and 8A1, which are biased in the forward direction. A sum voltage of voltages of the respective winding sections is applied to the X-ray tube 30.

When the switching element 24 is turned off, current energy stored in the leakage and excitation inductance of the transformer 2 is supplied to the capacitor 28. The voltage applied to the primary winding 4 is dropped along a curved line in a resonator and at the end thereof represents a negative potential. Then, after reaching a maximum value of a negative potential, the voltage returns to the DC source voltage. During an interval wherein a voltage applied to the primary winding 4 by the capacitor 28 is negative, positive voltages are induced in the respective winding sections of the secondary winding 6 at the winding finish side (which is not indicated by dots). These induced voltages are sequentially added through the diode sections 8B2n+2, 8A2n+1, 8B2n, . . . , 8An+4, 8Bn+3, 8An+2, 8Bn+1, 8An, . . . , 8A4, 8B3, 8A2, and 8B1, which are biased in the forward direction. In this manner, when a voltage applied to the primary winding 4 is negative, a sum voltage of respective voltages of the winding sections is applied to the X-ray tube 30. Therefore, a voltage excited in the secondary winding 6 is full-wave rectified into a triangular wave as if it was subjected to full-wave rectification, and is applied to the X-ray tube 30.

A switching circuit, provided at the side of the primary winding 4 of the transformer 2, is an inverter utilizing a voltage-resonance waveform. However, the switching circuit does not use the excitation inductance of the transformer 2, but uses the leakage inductance between the primary and secondary windings 4 and 6 and a resonance voltage waveform of the capacitor 28 so as to obtain a rectification output. Therefore, when the switching element 24 is kept on, a current from the DC source 22 induces a voltage in the secondary winding 6 through the leakage inductance, and is supplied to the X-ray tube 30 through the diode sections 8A2n+2, 8B2n+1, . . . , 8B2, and 8A1. When the switching element 24 is turned off, a current stored in the leakage inductance charges the capacitor 28 through the secondary winding 6 and the diode sections 8B2n+2, 8A2n+1, . . . , 8A2, 8B1 and further through the X-ray tube 30. In this manner, in the single-ended switching circuit which resonates using the leakage inductance and the capacitor 28, flyback pulses can be utilized for power transmission in addition to forward pulses; therefore, an output of full-wave rectification can be performed.

In this embodiment, the two diode sections to which induced voltages are applied from the respective winding sections are disposed on different substrates, thereby providing a considerable breakdown voltage. The diode sections to which the induced voltages are applied are positioned on every other section. In addition, the diode sections to which the induced voltages are applied are alternatively arranged in the diode groups 8A and 8B. In other words, the two diode sections, for example diode sections 8A1 and 8B1, provided in each of planes, which are perpendicular to the longitudinal direction of the primary winding 4, cannot receive voltage at the same time. For example, voltage is simultaneously applied to the diode sections 8A1, 8B2, 8A3, . . . of FIG. 1, but these diode sections are not on the same plane. In other words, if a size of the planes (or substrates) is uniform, the diode sections to which a voltage is applied are disposed to be spaced apart by the furthest distance. Therefore, a breakdown voltage of the diodes can be improved, and a compact and light-weight transformer can be provided. For example, in transformers of 150 KV type, a conventional transformer of this type has a weight of 200 Kg, but a transformer of this embodiment weighs only 70 Kg.

Figure 4:
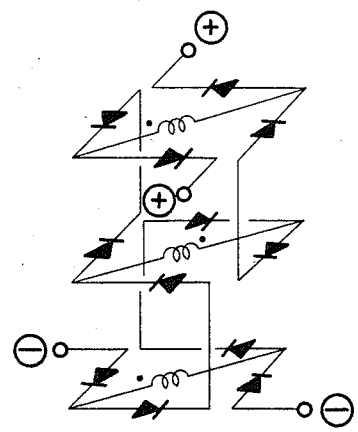
FIG. 4 is a perspective view schematically showing a high voltage transformer according to another embodiment of the present invention.

The present invention is not limited to the above embodiment, and various changes and modifications may be made within the spirit and scope of the present invention. For example, a wiring method of diodes and a secondary winding can use a step wiring as shown in FIG. 4. FIG. 4 shows only three winding sections for simplification, but a secondary winding is divided into a plurality of winding sections in the same manner as FIGS. 1 to 3. Winding start ends of the respective winding section are indicated by dots, and in respective diode sections, a plurality of diodes are connected in series.

In the above embodiment, the respective diode sections 8A1, 8A2, 8A3, . . . are disposed in single stages, but they can be disposed to be divided into a plurality of stages.

What is claimed is:

1. A high voltage transformer comprising:

a primary winding;

a secondary winding which is disposed to surround said primary winding, said secondary winding having a plurality of winding sections; and a rectifier circuit, said rectifier circuit having four planes which surround said secondary winding and a longitudinal direction of each of which is parallel with an axial direction of said secondary winding; first and second diode groups each of which has a plurality of diode sections including at least one diode, the diodes in each of said first and second groups being connected in series so as to have the same polarity directions and being disposed in said planes; and connecting means for connecting said diode sections to said winding sections so that both diode sections to which voltage induced in each of said winding sections is applied are not disposed on the same plane.

2. A high voltage transformer according to claim 1, wherein the diodes of each of said first and second diode groups are disposed on two adjacent planes.

3. A high voltage transformer according to claim 2, wherein the diodes of each of said diode sections are disposed along a line which bridges two adjacent planes and is perpendicular to the axial direction of said secondary winding, and two of said diode sections to which the induced voltage is applied are not on the same plane.

4. A high voltage transformer according to claim 3, wherein said diode sections comprise a plurality of diodes, respectively.

5. A high voltage transformer according to claim 4, wherein coupling points of two diode sections provided at the center of each of said first and second diode groups are grounded.

6. A high voltage transformer according to claim 2, wherein the diodes of each of said diode sections are disposed in the same plane.

7. A high voltage transformer according to claim 5, wherein said two of said diode sections to which induced voltage is applied are disposed on two adjacent planes.

* * * * *